United States Patent [19]

Cabaussel

[11] 4,401,908
[45] Aug. 30, 1983

[54] BRUSH-HOLDER ASSEMBLIES FOR ELECTRIC MOTORS, PARTICULARLY FOR TRACTION MOTORS

[75] Inventor: Louis Cabaussel, St. Bonnet de Mure, France

[73] Assignee: Societe L. Ferraz, Lyons, France

[21] Appl. No.: 352,277

[22] Filed: Feb. 25, 1982

[30] Foreign Application Priority Data

Mar. 20, 1981 [FR] France .................................. 8105794

[51] Int. Cl.³ ........................................... H02K 13/12
[52] U.S. Cl. ................................... 310/229; 310/230; 310/239; 310/241; 318/541; 322/56
[58] Field of Search ............... 310/229, 230, 231, 239, 310/241, 242, 238, 245, 246, 247; 318/292, 361, 541; 323/203; 322/55, 56

[56] References Cited

U.S. PATENT DOCUMENTS

| 930,007 | 8/1909 | Webster | 310/239 |
|---|---|---|---|
| 930,864 | 8/1909 | Kearney | 310/239 |
| 1,193,349 | 8/1916 | Bliss | 310/239 |
| 1,990,767 | 2/1935 | Whitsitt | 310/230 |
| 2,615,954 | 10/1952 | Mungovan | 310/239 UX |
| 3,026,433 | 3/1962 | Mueller | 310/239 |

Primary Examiner—R. Skudy
Attorney, Agent, or Firm—Dowell & Dowell

[57] ABSTRACT

A motor with a commutator, for example a traction motor, comprising brush-holders mounted on a ring adapted to rotate to bring them one by one opposite an inspection gate. The connection between these brush-holders and the fixed circuits is ensured by a system of split rings contacting on a blade, these rings being of clearly different diameters so that they are separated from one another except at their point of fixation. The supports of the brush-holders, the rings and the blades are identical and comprise a flat metal core with insulating coating working solely in compression.

3 Claims, 3 Drawing Figures

BRUSH-HOLDER ASSEMBLIES FOR ELECTRIC MOTORS, PARTICULARLY FOR TRACTION MOTORS

The present invention relates to improvements in brush-holder assemblies for electric motors, and particularly for traction motors.

It is known that, in certain electric motors, and in particular traction motors, the brush-holders are fixed to a ring which surrounds the commutator and which may rotate on the frame concentrically to said commutator, means being provided to block it in the desired position.

This arrangement was initially provided to enable the brushes to be adjusted with respect to the inductor of the motor, but, subsequently, it was soon used for facilitating inspection and replacement thereof. In fact, the motors of the type in question are generally closed by side elements which are very difficult to dismantle, and access to the brush-holders is consequently difficult. By providing an inspection door, this possibility of rotation of the support ring can be used to advantage to pass all the brush-holders successively thereopposite, this considerably facilitating operations. Once the operations are terminated, it suffices to block the ring in the correct, suitably marked position again.

However, this rotation of the brush-holder support ring naturally raises the problem of the connection between the brush-holders and the fixed circuits of the motor. To solve this problem, it has been thought to make this connection by means of rubbing contacts, namely blades and clips which grip therearound in the position of operation of the ring, the blades generally being borne by the frame and the clips by the ring.

However, producing the clips has heretofore involved expensive and delicate operations. Their arms are generally made by intimate superposition of elements made of thin elastic metal (brass, bronze) which must be cut out and shaped individually, the whole being machined with very small tolerances. In addition, for such clips to achieve the expected qualities of current conduction, the position of the blades with respect thereto must be very exact, any error considerably reducing the effective surface of contact.

It is an object of the invention to manufacture clips of this type more easily, such clips being able to tolerate substantial faults in the positioning of the blades.

According to the invention, a clip of the type in question comprises a series of split elastic rings of different diameters, tightened against one another at a point diametrically opposite their slits, the differences in diameter between the successive rings being such that, except at their the point of fixation, there is a considerable free space between the successive rings.

It will be readily understood that, under these conditions, the rings act individually, so that their manufacturing tolerances are fairly broad and it is unnecessary to proceed, after assembly, with a careful machining of the contact surfaces. In addition to the fact that these rings may be deformed independently of one another to a large extent, the clip is easily aligned with the corresponding blade even if the latter is not perfectly positioned.

The invention will be more readily understood on reading the following description with reference to the accompanying drawings, in which:

FIG. 1 shows a ring forming a support for the brush-holders in a traction motor or the like.

Figure 1:
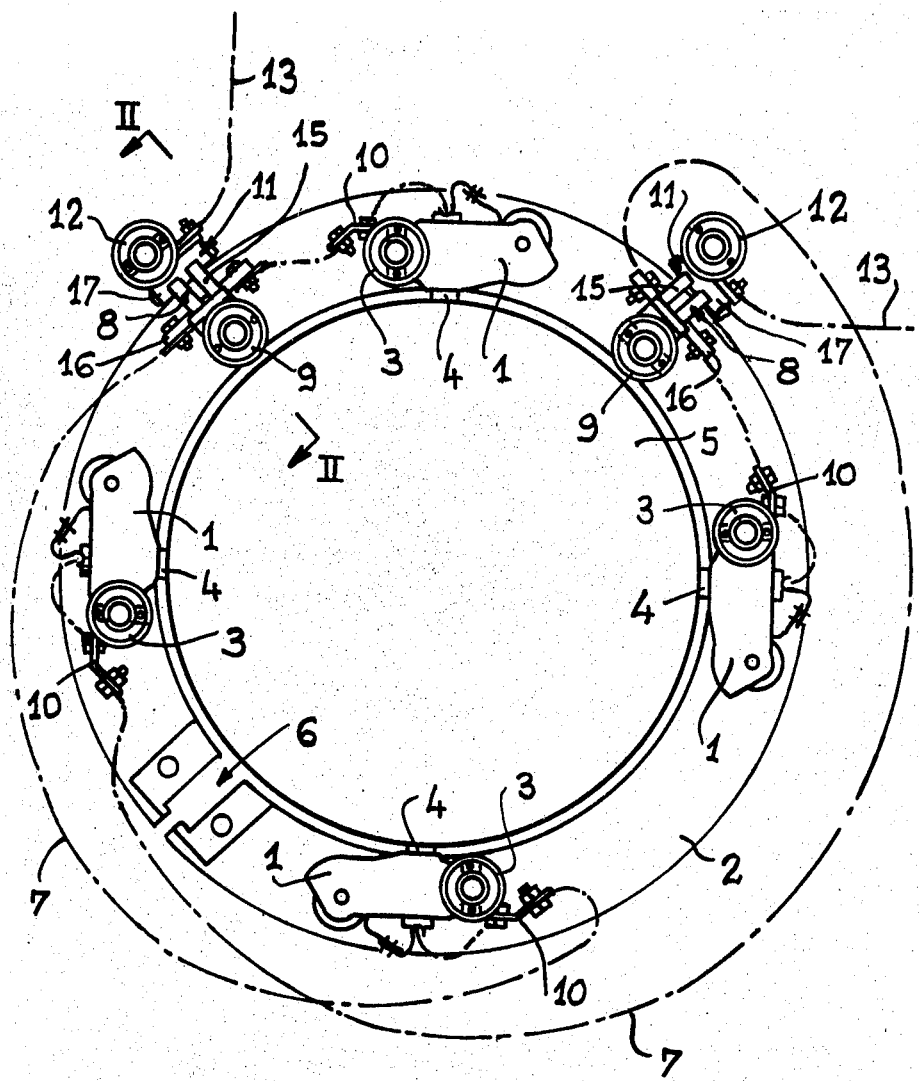

Referring now to the drawings, FIG. 1 shows four brush-holders generally designated by reference 1, which are fixed to a ring 2 via insulating supports 3. Reference 4 indicates the brushes enclosed in the brush-holders 1, and reference 5 the commutator on which they bear. The ring 2 is provided so as to be able to rotate concentrically with respect to the commutator 5 in a suitable guide made in the frame (not shown) of the motor or on a side element thereof. It is made of a split piece and, at the ends of the slit, referenced 6, means (not shown) are provided for closing it or spacing it apart, from the inspection gate, with a view to blocking the whole of the ring in its guide.

The opposite brush-holders 1, of the same polarity, are connected to one another by a cable 7. Although the two cables 7 have been shown as being located substantially outside of the ring 2, in fact they remain against said ring and may be fixed thereto at certain of their points to avoid their floating inside the motor.

With one of the two brush-holders of each of the pairs thus connected by the cables 7 there is associated a clip device 8 fixed to the ring 2 via a support 9 identical to the supports 3 of the brush-holders themselves, this device being connected to the brush-holders of the same polarity by a conducting segment 10. Each clip device 8 cooperates with a blade device 11 made fast with the motor frame or side element by means of an insulating support 12 which, there again, is identical to said supports 3. A cable 13 connects with and extends from each blade device.

Figure 2:
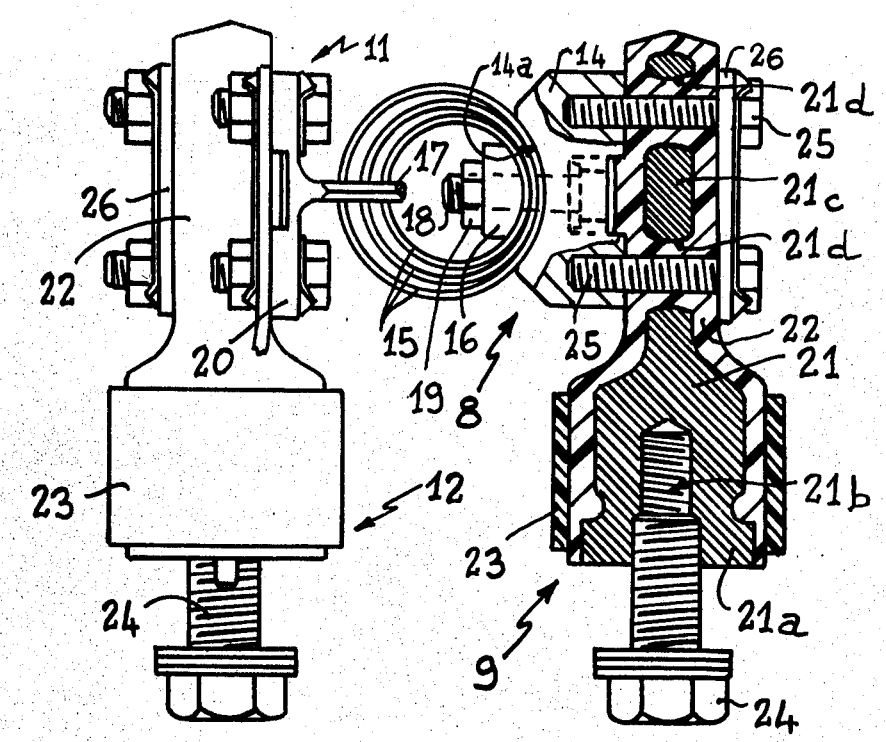
FIG. 2 is a section along II—II (FIG. 1) to a larger scale.

FIG. 2 shows the devices 8 and 11 in detail. The clip device 8 comprises a base 14 of which the face opposite the insulating support 9 is hollowed by an arcuate seat 14a, two successive sets of three split elastic rings 15, and a bar 16, suitably cross sectioned, which tightens the rings 15 against the seat 14a at a point thereof opposite their slits, which extend toward the base 20 and are aligned to receive, simultaneously , the blade 17 of device 11. Reference 18 indicates a threaded pin fixed to the base 14 and passing through the bar 16, its projecting end bearing an adjusting nut 19. The pin 18 passes between the two sets of rings 15, which may be notched laterally to this end. The bar 16 may terminate in non-sectioned ends which are disposed on either side of the base.

As shown, the rings 15 of each set are of notably different diameters, so that, in the zone of the blade 17 opposite the bar 16, substantial spaces exist between them.

The blade device 11 also comprises a conductive base 20 fixed to the insulating support 12; the blade 17 is integral therewith.

Figure 3:
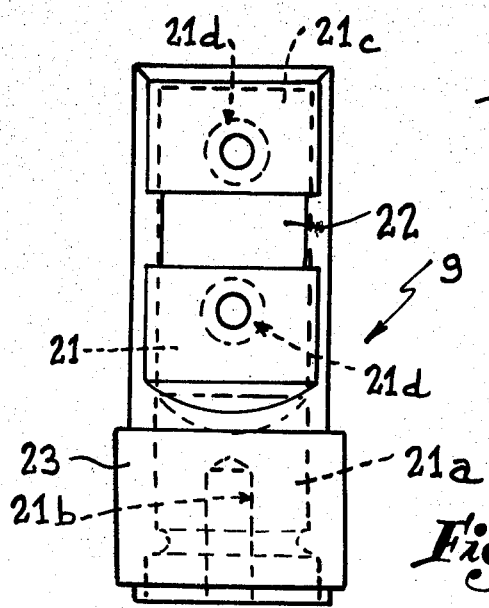
FIG. 3 is a plan view of one of the insulating supports used, with metal core.

As indicated above, the insulating supports 3, 9 and 12 are identical, and only the support 9 belonging to the clip device 8 will be described. This support comprises a metal metal core 21 (FIGS. 2 and 3), an insulating coating 22 injected therearound and a protective sleeve 23. The core 21 comprises a cylindrical base part 21a pierced with an axial blind bore 21b suitably threaded to receive a mounting screw 24; this base part 21a extends by a flat part 21c pierced with two successive wide holes 21d. The coating 22, made of glass-fibre reinforced heat-setting material, penetrates in the holes 21c, but its corresponding part is itself pierced coaxially with respect to these holes to receive screws 25 which are screwed in the base 14, their heads bearing against an anchor plate 26. The sleeve 23 is made of an incombustible material with very low coefficient of friction, and heat-resistant, such as the material known under the name of Teflon. It is mounted on the part of the coating 22 which surrounds the cylindrical base part 21a of the metal core 21.

It will be readily understood that, in each set of multiple rings 15, each of the rings acts individually to align itself on the blade 17 and tighten on it elastically. The assembly formed by these rings may therefore tolerate substantial faults in the position and orientation of the blades. Furthermore, such rings are very simple to manufacture and, as they act independently from one another, there is no need to machine their contact faces after assembly. The number of the sets of rings 15 may vary as a function of the current intensities to be transmitted, this making it possible to reduce to a minimum the number of types of these sets to correspond to the powers of the motors. The identical nature of the insulating supports 3, 9 and 12 facilitates manufacture and reduces the cost price. It will be noted that, in these supports, the plastics material is subjected solely to compressive strains which it is perfectly able to withstand. Furthermore, the sleve 23 performs the role of protector against the deposits of conducting dust which may provoke excitations, whilst ensuring that, even if a local fleeting arc appears, it will not create a conductive carbonaceous surface zone capable of facilitating leakages of current and subsequent arcing.

It must be understood that the preceding description has been given only by way of example and that it in no way limits the domain of the invention; the replacement of the details of execution described by any other equivalents would not depart from the scope of the invention. Although the insulating supports described are particularly adapted, others may possibly be used. It would also be possible to interpose shims between the various rings 15 in the portions thereof tightened between the bar 16 and the seat 14a insofar as this would not bring the split parts of these rings unduly close. There may be any number of rings in each set.

What is claimed is:

1. In an electric motor of the type having a brush holder support ring rotatable in a member fixed in the motor frame and having fixed-position current conducting cables for supplying current to the brush holders, the assembly comprising for each current conducting cable:
   (a) a first insulating support, the support having a conductive base fixed thereto and connected with said cable;
   (b) a second insulating support fixed to the support ring and having a conductive base connected by a conducting segment to brush holders of the same polarity on the ring;
   (c) a set of resilient split rings of different diameters secured to the base of one of said insulating supports and tightened thereon between arcuate seat means, the rings extending toward the conductive base on the other of said insulating supports, and the split rings in each set having all of their ends aligned and extending toward said other conductive base;
   (d) blade means secured to the conductive base of said other insulating support and extending toward said one insulating support, the blade means being disposed to enter the split rings in rubbing contact with their aligned ends when the support ring is rotated to align said conductive bases; and
   (e) the different diameters of the split rings of each set being such that when the set is tightened between the arcuate seat means the ends of the different rings where they contact the blade means are substantially spaced from each other.

2. In an assembly as claimed in claim 1, the arcuate seat means of the base of said one insulating support comprising an arcuate seat having a threaded pin extending therefrom, and an arcuate bar having a hole therethrough receiving said pin, and a nut on the threaded pin for tightening the bar against a set of rings interposed between the bar and the seat.

3. In an assembly as claimed in claim 1, each said insulating support comprising a metal core having mounting screw means connected therewith, the core having a hole therethrough for fixing the associated conductive base thereto, the core having a coating of insulating material around it and between it and the base; and a sleeve of heat-resistant incombustible material having a low coefficient of friction surrounding the support.

* * * * *